Jan. 18, 1944.  W. H. CASSEL  2,339,375
GEAR CUTTING METHOD AND MACHINE
Filed Feb. 17, 1939  6 Sheets-Sheet 3
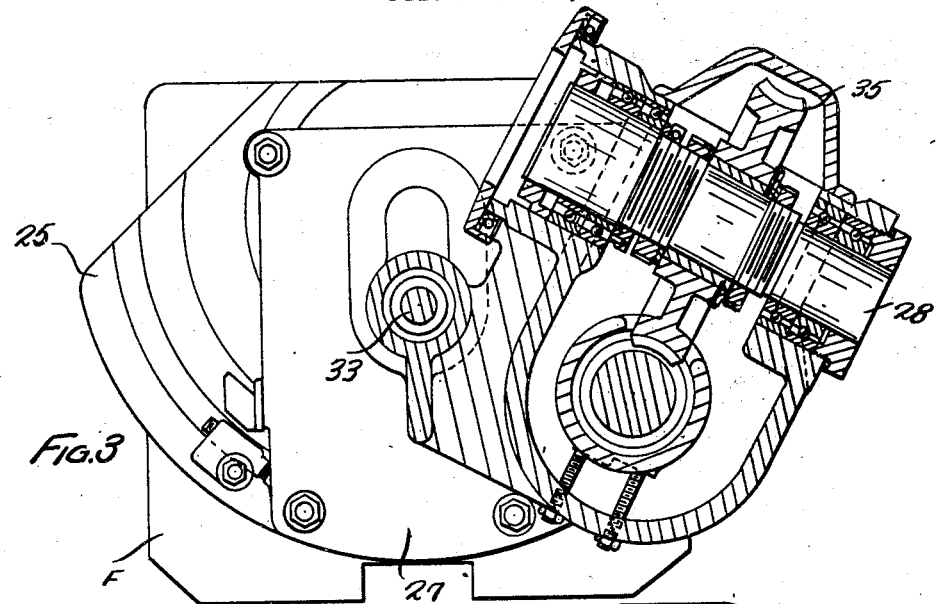
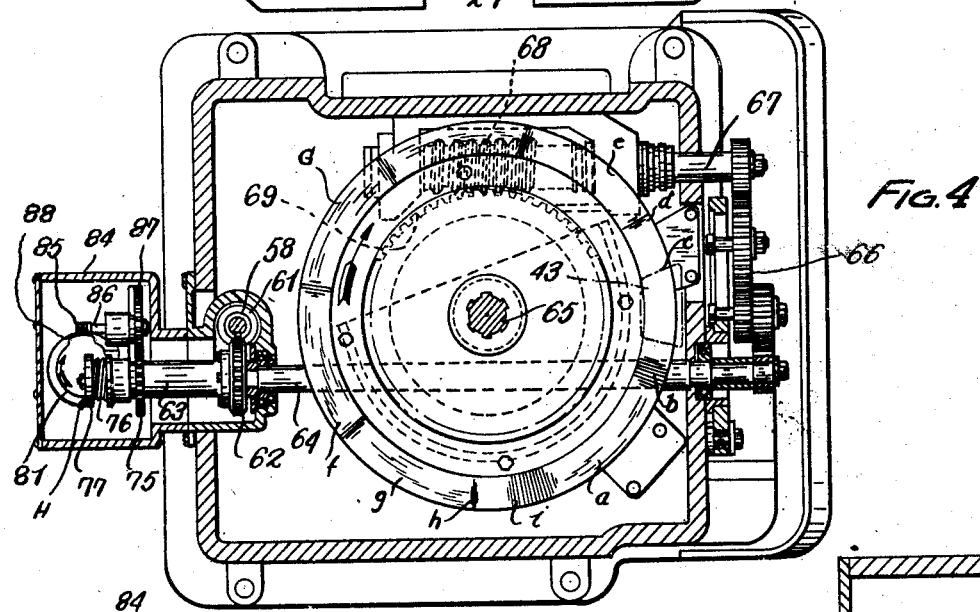
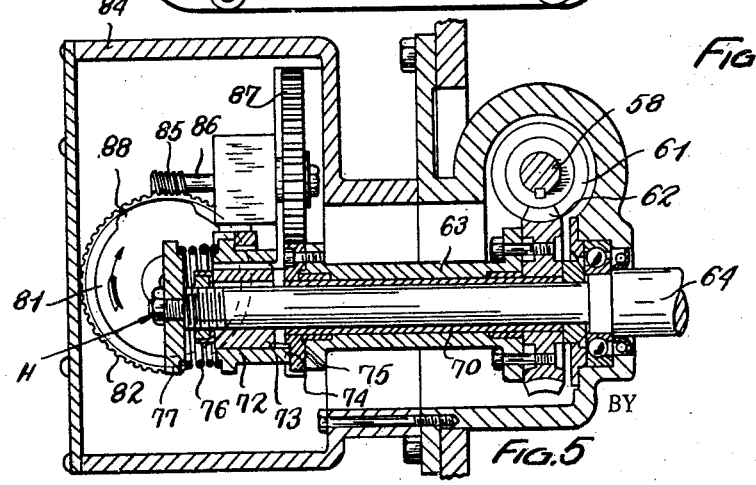
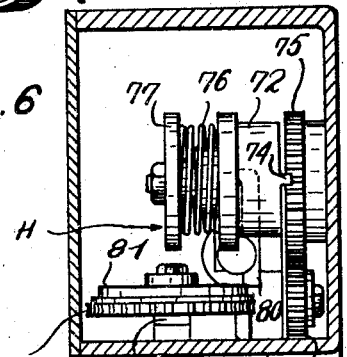
INVENTOR.
WILLIAM H. CASSEL
BY
ATTORNEYS

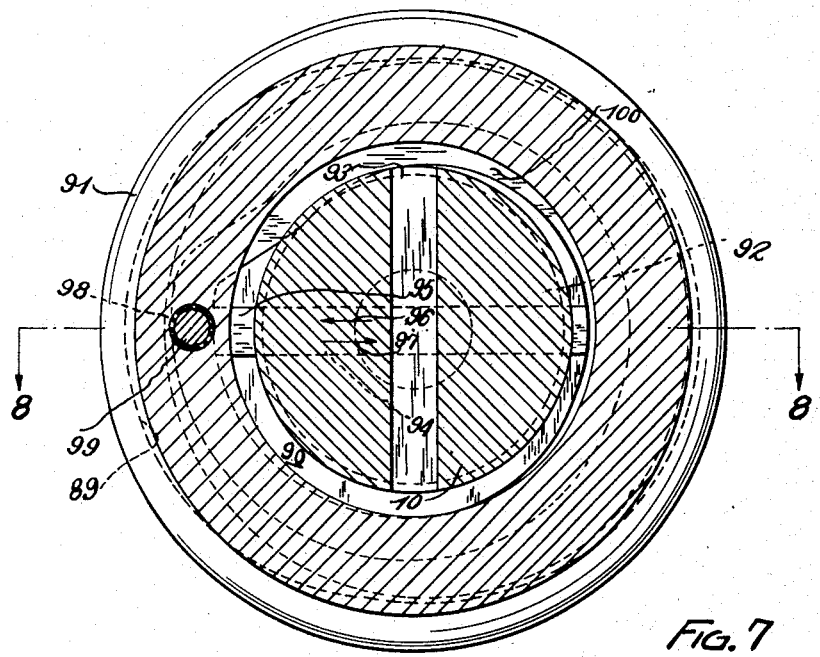

INVENTOR.
WILLIAM H. CASSEL
BY
Kwis Hudson E Kent
ATTORNEYS

INVENTOR.
WILLIAM H. CASSEL
BY
Kwis Hudson & Kent
ATTORNEYS

Patented Jan. 18, 1944

2,339,375

UNITED STATES PATENT OFFICE 2,339,375

GEAR CUTTING METHOD AND MACHINE

William H. Cassel, Cleveland, Ohio, assignor to The Cleveland Hobbing Machine Company, Cleveland, Ohio, a corporation of Ohio Application February 17, 1939, Serial No. 256,970

12 Claims. (Cl. 90—5)

The present invention relates to machines and methods of cutting gears and more particularly to machines for and methods of cutting spiral beveled gears, especially spiral bevel pinion gears.

An object of the present invention is the provision of a novel and improved method of cutting spiral beveled gears, especially spiral beveled pinion gears, wherein a face-type tool having its cutting edges or teeth arranged in a spiral and a tapered gear blank are continuously rotated in cutting relation while a linear relative movement between the axis of the spiral of the teeth and the blank is produced at right angles to the axis of said spiral and in a direction generally longitudinally of the tooth space being formed whereby the cutting edges or cutting teeth are made to substantially follow the mean curve of the tooth space being formed.

Another object of the present invention is the provision of a novel and improved machine for cutting spiral beveled gears, especially spiral beveled pinion gears, wherein a face-type tool having the cutting teeth thereof arranged in the form of a spiral and a tapered gear blank are continuously rotated during the cutting operation, while a linear relative movement is being imparted thereto at right agnles to the axis of rotation of the cutter and in a direction generally longitudinally of the tooth space being formed, which machine will be simple and rigid in construction, will have a high production of very accurate gears, and will be easy to set up and adjust for cutting different gears.

The present invention resides in certain details of construction, combinations and arrangements of parts, and further objects and advantages thereof will be apparent to those skilled in the art to which it relates from the following description of the preferred embodiment thereof described with reference to the accompanying drawings forming a part of this specification, in which similar reference characters designate corresponding parts through the several views, and in which:

Fig. 3 is a section approximately on the line 3—3 of Fig. 2;

Fig. 4 is a section approximately on the line 4—4 of Fig. 2;

Fig. 5 is a section approximately on the line 5—5 of Fig. 2;

Fig. 6 is an enlarged view of a portion of Fig. 2;

Fig. 7 is a section approximately on the line 7—7 of Figs. 2 and 8;

Fig. 13 is a view similar to Fig. 9 but showing a modified form of cutter.

Figure 1:
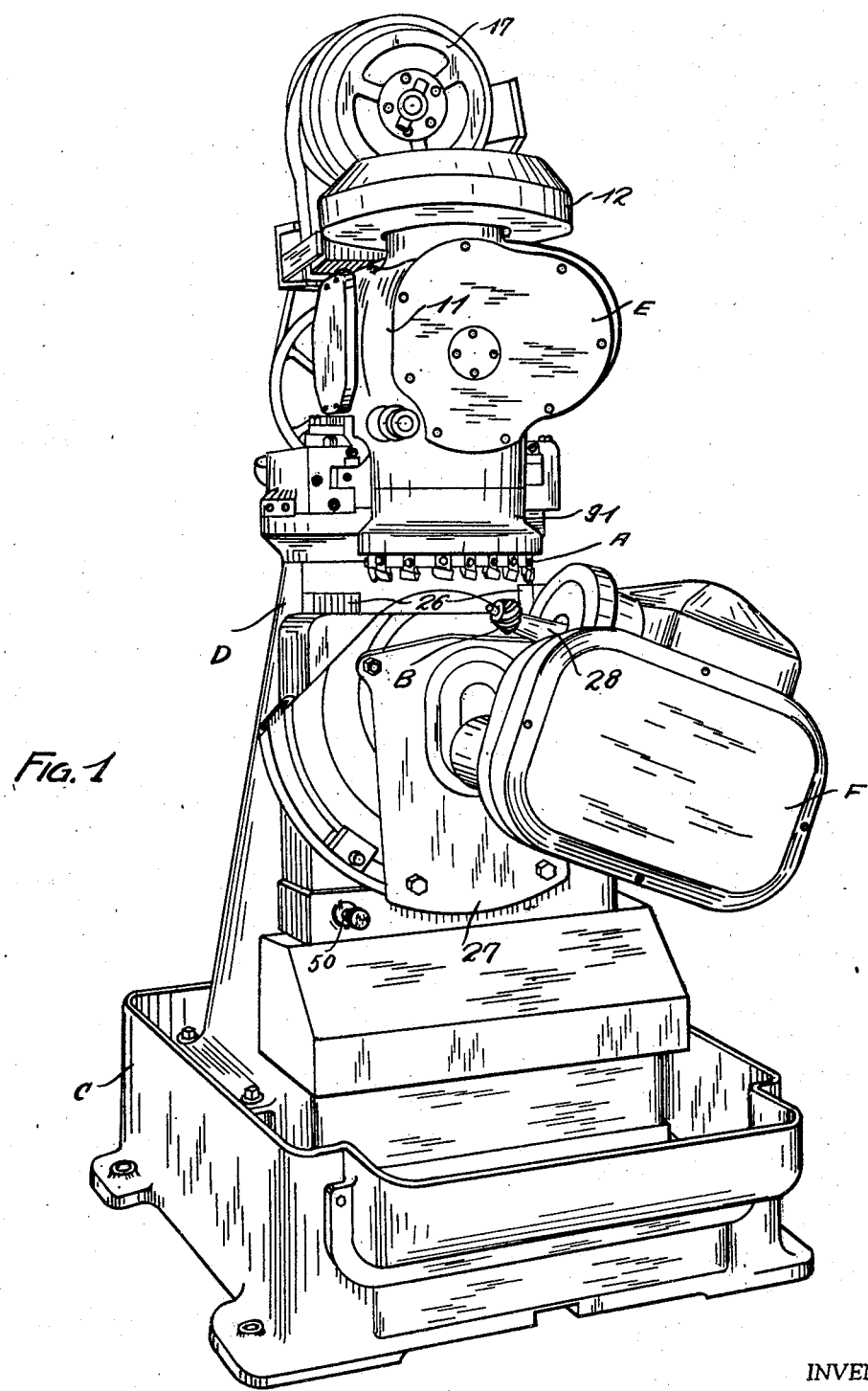
Fig. 1 is a perspective view of a gear cutting machine embodying the present invention.

Referring to the drawings, Fig. 1 shows a continuous indexing spiral beveled pinion gear cutting machine wherein a face-type tool A having the cutting teeth thereof arranged in the form of a spiral and a gear blank B are continuously rotated in cutting relation to produce a spiral beveled pinion gear. The cutting operation will be hereinafter more specifically referred to. In some respects it resembles hobbing while in others it resembles form milling and "rotary broaching," a term that has recently been applied to some metal cutting operations. The operation is closer to hobbing than any other standard operation because of the continuously indexing feature and the fact that the cutting edges or teeth of the tool are arranged on a spiral. For these reasons the cutter is referred to herein as a face hob to distinguish it from the well known face milling cutters. In some respects the cutter may be considered a "rotary broach."

In general the machine shown comprises a rectangular base C, which also serves as an oil or drip pan; an upright frame D bolted thereto; a tool head assembly, designated generally by the reference character E, slidably supported on horizontal ways formed on the top of the frame D; and a work head assembly, designated generally by the reference character F, slidably supported on vertical ways formed on the front of the column D. The work head F is moved vertically along the ways on the front of the column D to feed the work to the cutter and withdraw the same therefrom by a rotatable cam G supported in the lower part of the column D and driven or rotated in a manner hereinafter specifically pointed out.

The tool or cutter head E comprises a vertical spindle 10 rotatably supported in the tool head housing 11 through the medium of suitable bearings provided with means for taking up wear, etc. The cutter A is detachably secured to the lower end of the spindle 10 in a manner hereinafter referred to and the upper end of the spindle carries a flywheel 12 keyed thereto, which serves the usual purpose. The spindle 10 is adapted to be driven or rotated by a spur gear 14, keyed to the right-hand end of a horizontal shaft 15 rotatably supported in the tool head housing 11, through the medium of change gears, etc. (not shown), and a worm wheel 16 keyed to the spindle. The horizontal shaft 15 is driven from an electric motor 17 mounted on the top of the tool head housing 11, the operation of which is controlled in any suitable manner.

The work head F comprises a member 25 supported for vertical movement along the vertical ways 26 formed on the front of the column D and a second member 27 carried thereby and adjustable thereon about a horizontal axis. The work spindle 28 is rotatably supported in the member 27 by means of suitable bearing members, etc. (see Fig. 3), and is driven from a horizontal shaft 30, coaxial with the axis about which the member 27 is adjustable, through spur gears 31, 32, shaft 33, change gears 34, etc., and a worm wheel 35 keyed to the work spindle. The horizontal shaft 30 is operatively connected to a vertical shaft 36 rotatably supported in the column D by miter gears 37 and 38, the latter of which is splined to the shaft 36 to provide for the vertical movement of the work head F. The vertical shaft 36 is operatively connected to and rotated from the horizontal shaft 15 by miter gears 39 and 40, the latter of which is splined to the shaft 15, to permit forward and backward adjustment of the tool head E along the ways at the top of the frame. The motor 17 is connected to the shaft 15 by a V-belt drive 41.

The work head F is adapted to be moved vertically to feed the work to the cutter and retract the same therefrom by the cam G, previously referred to, through the medium of a roller 43 which engages and rolls upon the upper surface of the cam. The roller 43 is carried by a short shaft 44 fixed in the lower end of a member 45 connected to the member 25 and adjustable vertically relative thereto to facilitate the "setting up" of the machine. The adjustment of the member 45 relative to the member 25 is effected by a cooperating lead screw 46 and nut 47, the former of which is carried by the member 25 and the latter by the member 45. To facilitate manipulation of the lead screw 46, and in turn the adjustment of the height of the work blank, the lower end of the lead screw is provided with a worm wheel 48 which worm wheel is operatively connected by suitable mechanism (not shown) to a horizontal shaft 50 projecting to the exterior of the member 25 where the projecting end thereof is provided with a hand wheel or knurled hand grasp for manual operation.

Figure 2:
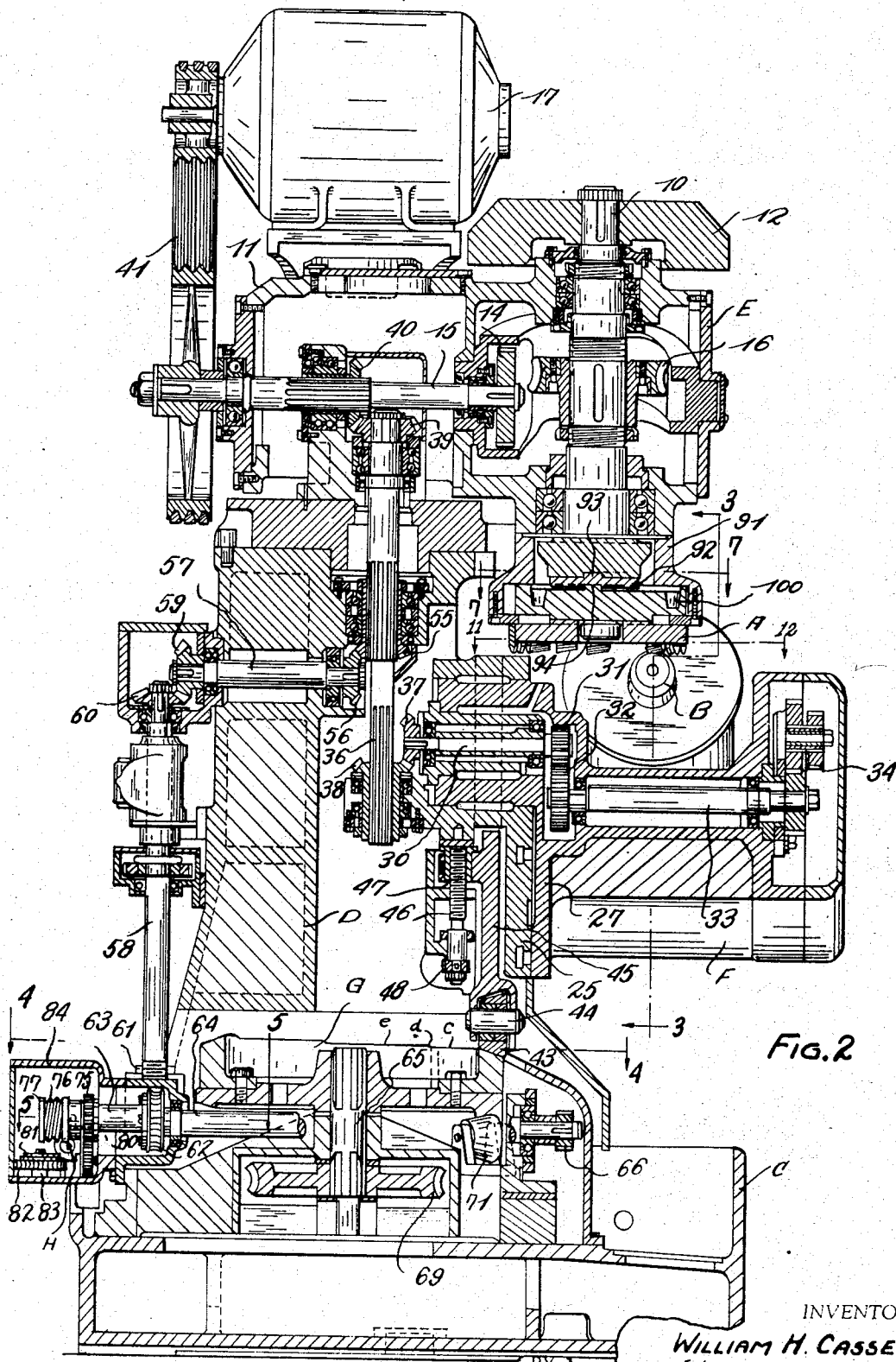
Fig. 2 is a vertical section through the machine shown in Fig. 1 on the centerline thereof.
Figure 8:
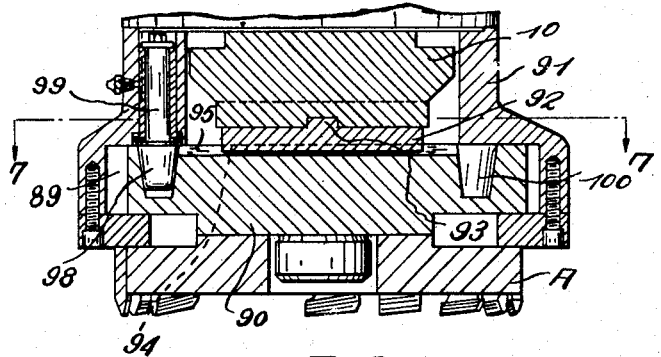
Fig. 8 is a section approximately on the line 8—8 of Fig. 7.
Figure 9:
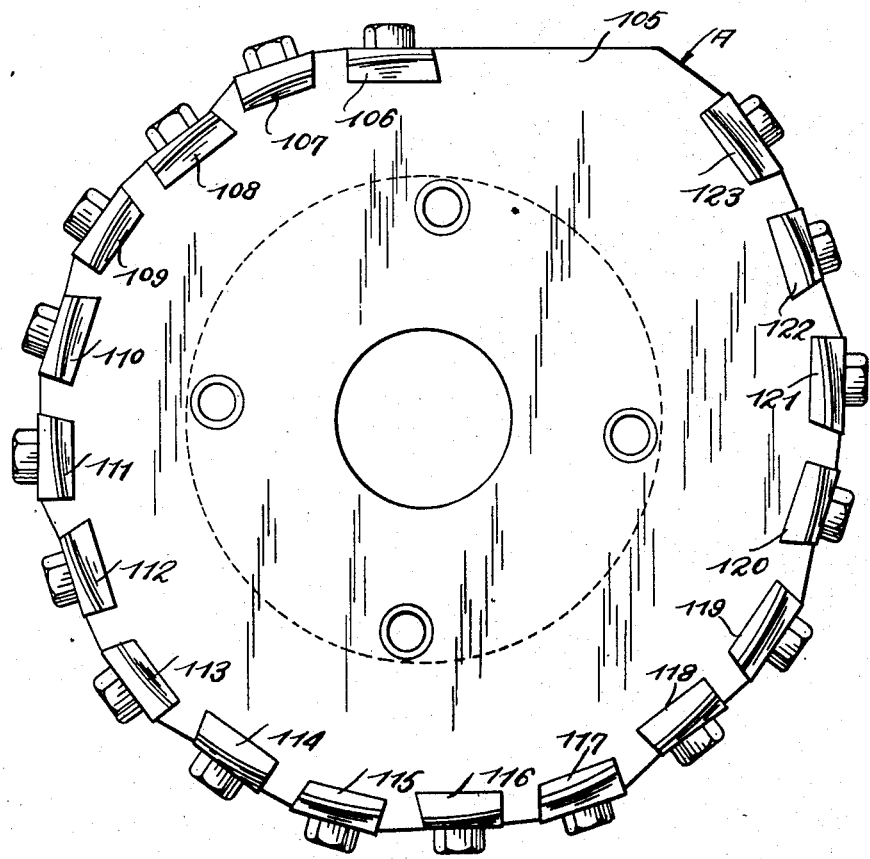
Fig. 9 is a plan view of the underside of the cutter.
Figure 10:
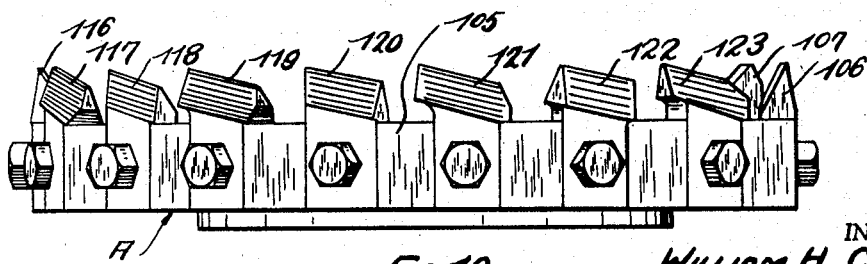
Fig. 10 is a side elevation of the cutter.

The cam G is driven or rotated from the vertical shaft 36 through the medium of miter gears 55 and 56, the former of which is rotatably supported in the column D and splined to the shaft 36 while the latter is fixed to the right-hand end of a horizontal shaft 57. The shaft 57 is operatively connected to a vertical shaft 58 through miter gears 59 and 60. The lower end of the shaft 58 carries a worm gear 61 fixed thereto, which is continuously in mesh with a worm wheel 62 fixed to the right-hand end of a horizontal tubular shaft 63 supported coaxial with a solid shaft 64. The right-hand end of the solid shaft 64, as viewed in Figs. 2 and 4, is operatively connected to a vertical shaft 65 which carries the cam G, through change gears designated generally by the reference character 66, shaft 67, and a worm 68 and worm wheel 69, the latter of which is keyed to the lower part of the shaft 65. The two coaxial shafts 63 and 64 are separated by a bushing member 70 interposed therebetween and are adapted to be operatively connected to each other by a clutch, designated generally by the reference character H. Since the entire weight of the work head F, etc., is supported by the cam G, a plurality of backing rollers 71 are provided thereunder adjacent the front of the machine. These rollers carry the weight of the work head, which otherwise would have a tendency to displace the cam.

In operation, the work blank is fed into the cutter which makes one complete revolution, while the blank is rotating an amount approximately equal to one tooth. The work may be gradually raised in a continuous movement until the cutter reaches full depth, but preferably it is raised in a number of steps. In the embodiment shown, the cam G is continuously rotated except as hereinafter noted, and the loading operation is performed while the low part $a$ of the cam travels underneath the roller 43. At the end of the loading period the roller 43 rides up the incline $b$ which quickly brings the work blank up to the cutter. While the level portion $c$ of the cam travels underneath the roller 43 the blank makes one revolution and the first roughing cut is completed. The work is then raised a small amount by the inclined portion $d$ and another roughing cut taken, while the level portion $e$ travels underneath the roller. In the present instance six roughing cuts are taken, the last two of which take place during the travel of the portions $f$ and $g$ of the cam underneath the roller 43.

As soon as the last roughing cut is completed the work blank is elevated a small amount preferably about .010" by the roller 43 moving up the incline $h$. Shortly after the roller reaches the high part $i$ of the cam the rotation of the cam G is interrupted by the disengagement of the clutch H, and the finishing cut taken while the cam is stationary. This precludes the possibility of any errors being introduced into the teeth due to possible irregularities in the cam surface or in the backing rollers which support the cam. Immediately upon the completion of the finishing cut, the clutch H is automatically engaged and the cam resumes its rotation, whereupon the roller 43 travels down an inclined portion $i$ of the cam, and the finished work blank is thereby withdrawn from the cutter. In Fig. 1 the various parts of the machine are shown in the position which they occupy immediately after the blank has been chucked to the work spindle. Fig. 2 shows the position of the parts at the beginning of the first roughing cut.

The single tooth clutch H shown, which is the preferred embodiment, although other types of clutches may be employed, comprises a driven part or member 72, slidably keyed on a member 73 fixed to the shaft 64 adjacent to the left-hand end thereof. The member 72 is driven through the medium of a lug or tooth 74, formed integral therewith, adapted to project into and engage within a suitable slot formed in the side of a spur gear 75 fixed to the left-hand end of the tubular shaft 63. The driven member 72 of the clutch H is continuously urged toward the right to engage the projection 74 within the slot in the gear 75 by a compression spring 76 interposed between the end thereof and a member 77 secured to the end of the shaft 64. In predetermined timed relation to the other operations of the machine the driven member 72 is moved towards the left to disengage the lug 74 from the slot in the gear 75, and thereby interrupt the drive to the shaft 64 and in turn the rotation of the cam G, by a pivot lever 80 the lower end of which engages a horizontal face cam 81, fixed to the upper side of a worm wheel 82 rotatably supported on a shaft 83 fixed to a housing 84 bolted or otherwise secured to the rear part of the column D. The cam 81 is continuously rotated through the medium of the worm wheel 82 by a worm 85 continuously in mesh therewith and fixed to the left-hand end of a shaft 86 which also carries a spur gear 87, which gear is in mesh with the gear 75. The construction of the cam 81 is such that the high part thereof, designated by reference character 88, rotates or moves the lever 80 in a counterclockwise direction at a predetermined point in the cycle of operation of the machine, and retains the clutch in a disengaged condition for the duration of the finishing cut, as heretofore referred to.

Figure 11:
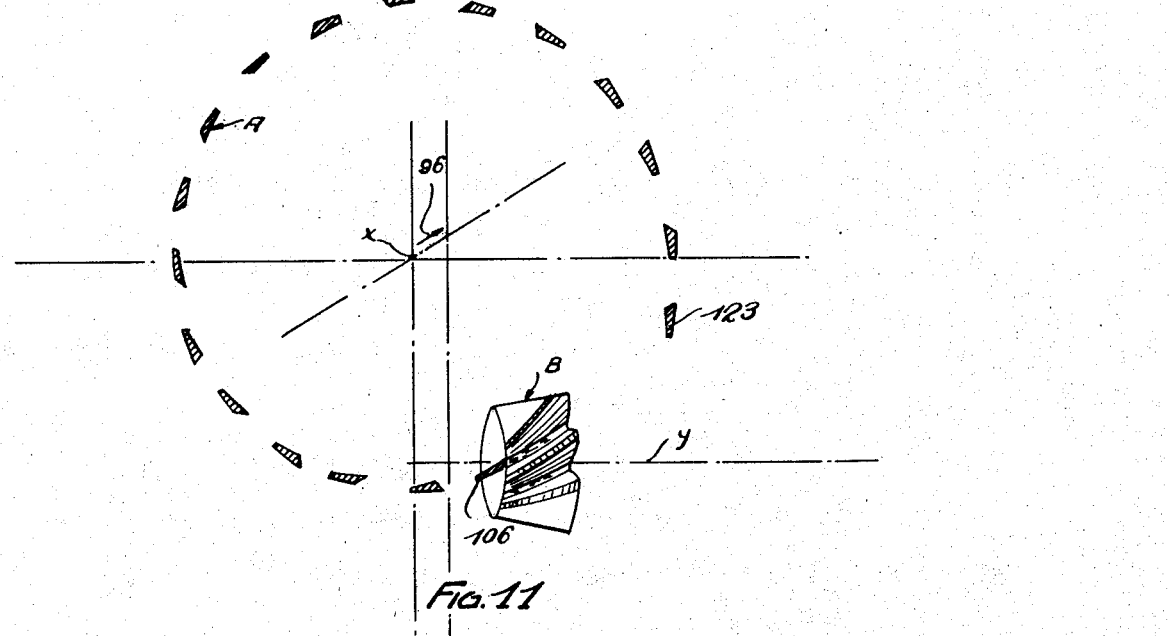
Figs. 11 and 12 are views approximately on the line 11—12 of Fig. 2, showing two positions of the cutter and work.
Figure 12:
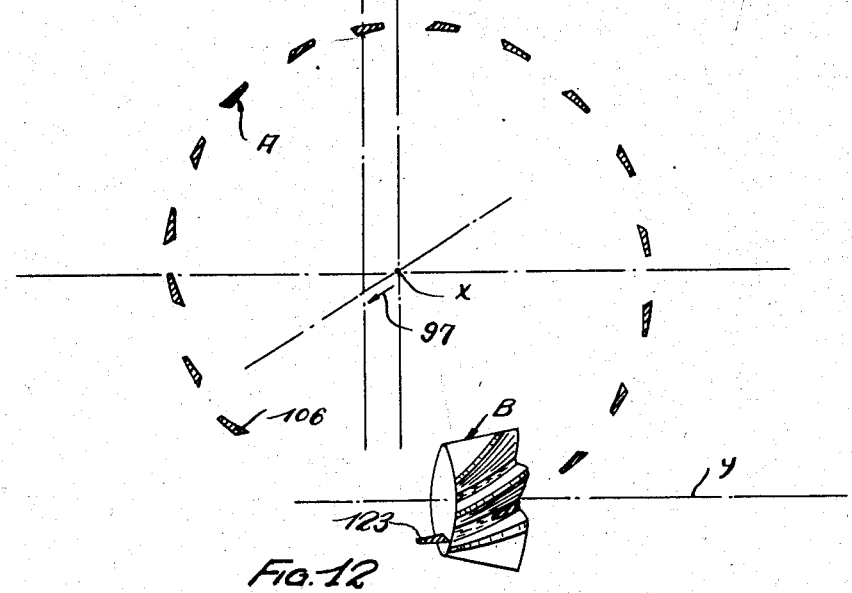

Heretofore in the art, spiral bevel gears have been cut by rotating a face-type tool having cutting teeth or edges extending generally parallel to the axis of rotation thereof and arranged in the form of a scroll or spiral, in mesh with a continuously rotating blank but this method has certain inherent limitations. Due to the fact that the lead of the spiral is limited to a multiple of the pitch of the gear to be cut, etc., it is not suited for cutting spiral beveled gears of small sizes as the cutting edges or teeth cannot be made to follow the mean curve of the inter-dental spaces with the desired accuracy. According to the provisions of the present invention, this difficulty is overcome by effecting a relative movement between the axes of rotation of the cutter and blank at right angles to the axis of rotation of the cutter and in a direction generally longitudinally of the tooth space being formed, thus making it possible to obtain in effect a spiral of any desired lead. Practically the lead of the spiral is greater than the pitch of the gear being cut, and the spiral runs ahead of the blank, so to speak. Provision is, therefore, made for returning the axes of the cutter and blank to their initial relative position for each rotation of the cutter. This relative movement between the axes of rotation of the cutter and blank is shown in Figs. 11 and 12, wherein $x$ represents the axis of the tool and $y$ the axis of the blank. Fig. 11 shows the relative position of the two axes of rotation at the beginning of the cut, that is, as the leading tooth of the scroll or spiral enters an inter-dental space. Fig. 12 shows the relative position of the axes of the cutter and blank as the last tooth of the spiral enters the same inter-dental space. While the teeth of the cutter are passing through the inter-dental space, the axes of the tool and blank are gradually shifted from the relative position shown in Fig. 11 to the relative position shown in Fig. 12. The cutter is provided with a blank space or gap and in the interim between the time the last tooth of the spiral clears an inter-dental space and the time the leading tooth of the spiral engages a different inter-dental space, the axes of the cutter and blank are returned to their original relative position shown in Fig. 11. The character and the extent of the shifting of the axis is determined by the characteristics of the gear being cut and the tool used to cut the same. As will be understood in the art the tool may be either of the single or multiple lead type.

In the preferred embodiment of the invention shown, the relative movement between the axes of the cutter and blank is effected by a movement of the axis of rotation of the cutter. As shown, the cutter A is attached to the underside of a member 90 rotatably and slidably supported in an elongated aperature 89 in the lower end of a housing 91 fixed to the lower end of the tool head E. The member 90 is adapted to be driven from the tool spindle 10 through the medium of a member 92 having a tongue 93 in its upper side which engages within a groove formed in the lower end of the work spindle 10. The member 92 has a similar groove 94 on the underside which engages a suitable tongue 95 in the upper side of the member 90. The tongues 93 and 95 are located at right angles to each other and the construction is such that the member 90 and in turn the cutter A are rotated from the tool spindle 10 while permitting the member to float or reciprocate in the aperture 89 relative thereto in a plane normal to the axis of rotation. The member 90 is reciprocated in the direction of the arrows 96 and 97 (see Fig. 7) to change the relative position of the axes of rotation of the cutter A and the blank B by a roller 98 carried on the lower end of the shaft 99 secured in the member 91, which roller engages within a cam track 100 formed in the upper side of the member 90. The contour of the cam track 100 is such that upon rotation of the spindle 10, the axis of rotation of the cutter A is gradually shifted from the position shown in Fig. 11 at the beginning of the cutting operation to the position shown in Figs. 7 and 12 at the end of the cutting operation, and is quickly returned to its initial position shown in Fig. 11 during the interim between the time the last tooth of the spiral leaves an inter-dental space and the time the first tooth of the spiral enters another inter-dental space.

The cutter A shown is of the inserted tooth type and comprises a cutter head or body 105 having a plurality of inserted teeth 106 to 123, inclusive. Alternate teeth of the cutter cut on opposite sides of the inter-dental space as more clearly shown in Figs. 11 and 12. As shown, the cutting edges of the teeth are all different and cut at different places along the gear tooth to develop the desired surface. The scroll arrangement of the teeth of the cutter, together with the linear movement and the fact that both the cutter and blank are continuously rotated produces extremely accurate work.

Fig. 13 shows a cutter of modified construction having a double row of teeth. The cutter shown is of the inserted tooth type and comprises a disk-like body portion 130 provided with a plurality of teeth 131 to 160, inclusive, arranged in a double scroll or spiral. The teeth 131 to 148, inclusive, cut in one inter-dental space while the teeth 149 to 160, inclusive, cut in another. Alternate teeth cut on opposite sides of the inter-dental spaces in a manner similar to that described with reference to the cutter A. The second scroll or spiral decreases the cutting time for a given gear and in some instances is necessary to obtain the desired tooth form. The use of a plurality of scrolls is especially desirable in cutting spiral bevel pinion gears for conventional hypoid gear drives used in automobiles where each tooth extends about one-fourth of the way around the pinion.

While the preferred embodiment of the invention has been illustrated and described in some detail, it will be apparent that numerous changes in the construction shown may be made within the scope of this invention. As already stated, the cam G may have a continuous rise rather than a plurality of steps, in which event the work blank would be gradually fed to the cutter, but in either event the rotation of the feed cam is preferably interrupted during the finishing cut so that possible irregularities in the cam will not be transferred to the gear being cut.

The preferred embodiment shown is merely illustrative of the invention, and it is my intention to cover all adaptations, modifications and uses thereof that come within the practice of those skilled in the art to which the invention relates, and I particularly point out and claim as my invention the following:

1. The method of cutting a longitudinally curved gear tooth on a tapered or beveled gear blank which comprises rotating a plurality of cutting edges arranged on a spiral and extending generally parallel to the axis thereof in cutting relationship with a rotating tapered or beveled gear blank, and simultaneously producing a linear relative movement between the axis of the spiral of the cutting edges and the gear blank at right angles to the axis of said spiral and in a direction generally longitudinally of the tooth space being formed whereby the cutting edges are made to substantially follow the curve of the tooth space being formed.

2. The method of cutting tapered or beveled gears having longitudinally curved teeth which comprises rotating a plurality of cutting edges arranged on a spiral and extending generally parallel to the axis thereof in cutting relationship with a continuously rotating tapered or beveled gear blank while producing a linear relative back and forth movement between the axis of the spiral of the cutting edges and the gear blank in timed relation to the rotation of the gear blank, said linear movement being at right angles to the axis of said spiral and in a direction generally longitudinally of the tooth space being formed whereby the cutting edges are made to substantially follow the curve of the respective tooth space being formed thereby at any particular instance.

3. The method of cutting tapered or beveled gears having longitudinally curved teeth which comprises continuously rotating a tapered gear blank in timed relation with a continuously rotating face-type tool having a series of cutting edges extending generally parallel to the axis of rotation thereof and arranged in a spiral, and simultaneously producing a linear relative movement between the axis of rotation of the tool and the blank at right angles to the axis of rotation of the tool and in a direction generally longitudinally of the tooth space being formed whereby the cutting edges are made to substantially follow the curve of said tooth space.

4. In a gear cutting machine of the character described, the combination of: means for rotatably supporting a face-type tool having a series of cutting edges arranged on a spiral; means for rotatably supporting a tapered gear blank in cutting relation with the tool; power actuated means for continuously rotating the tool and gear blank in timed relation; and power actuated means for producing, simultaneously with the rotation of the tool and gear blank and in timed relation thereto, a linear relative movement between the tool and the gear blank at right angles to the axis of rotation of the tool and in a direction generally longitudinally of the tooth space of the gear blank through which the series of blades is passing.

5. In a gear cutting machine of the character described, the combination of: means for rotatably supporting a face-type tool having a plurality of cutting edges arranged on a spiral; means for rotatably supporting a tapered gear blank in cutting relation with the tool; means for continuously rotating the tool and gear blank in timed relation; and means for producing in timed relation to the rotation of the tool and gear blank a linear relative movement between the tool and the gear blank at right angles to the axis of rotation of the tool and generally longitudinally of the tooth space being formed, in one direction while said plurality of cutting edges is passing therethrough, and in the opposite direction prior to the entry of said cutting edges in a different tooth space of the gear blank.

6. In a gear cutting machine of the character described, the combination of: a tool support, means for rotatably supporting said tool support; means for attaching a face-type tool having a plurality of cutting edges arranged on a spiral to said tool support; a work spindle adapted to support a tapered gear blank in cutting relation with said tool; means for rotatably supporting said work spindle; means for continuously rotating said tool support and said work spindle in timed relation to each other; and means for producing in timed relation to the rotation of the tool support and the work spindle a linear relative movement between said tool support and said work spindle at right angles to the axis of rotation of said tool support and generally longitudinally of the tooth space being formed, in one direction while said plurality of cutting edges is passing therethrough, and in the opposite direction subsequent to the passage of said plurality of cutting edges through one tooth space of the gear blank and prior to the entry thereof in a different tooth space of the gear blank.

7. In a gear cutting machine of the character described, the combination of: means for rotatably supporting a face-type tool having a plurality of cutting edges arranged in the form of a spiral with a blank space between the ends thereof; means for rotatably supporting a tapered gear blank in cutting relation with the tool; means for continuously rotating the tool and gear blank in timed relation; and means for producing in timed relation to the rotation of the tool and gear blank a linear relative movement between the tool and the gear blank at right angles to the axis of rotation of the tool and generally longitudinally of the tooth space being formed, in one direction while said plurality of cutting edges is passing therethrough, and in the opposite direction while the blank space is abreast of the gear blank.

8. In a gear cutting machine of the character described, the combination of: a tool support, means for rotatably supporting said tool support; means for attaching to said tool support a face-type tool having a plurality of cutting edges adapted to follow each other through a tooth space, said cutting edges being arranged on a spiral with a blank space or gap between the last and the first thereof; a work spindle adapted to support a tapered gear blank in cutting relation with said tool; means for rotatably supporting said work spindle; means for continuously rotating said tool support and said work spindle in timed relation to each other; and means for producing in timed relation to the rotation of the tool support and the work spindle a linear relative movement between said tool support and said work spindle at right angles to the axis of rotation of said tool support and generally longitudinally of the tooth space being formed, in one direction while said plurality of cutting edges is passing therethrough, and in the opposite direction while the blank space or gap is abreast of the gear blank.

9. In a gear cutting machine of the character described, the combination of: means for rotatably supporting a face-type tool having a plurality of cutting edges arranged on a spiral; means for rotatably supporting a tapered gear blank in cutting relation with the tool; means for continuously rotating the tool and gear blank in timed relation; and means for moving the tool in a straight line at right angles to the axis of rotation thereof and generally longitudinally of the tooth space being formed, in one direction while said plurality of cutting edges is passing therethrough, and in the opposite direction prior to the entry of said cutting edges in a different tooth space of the gear blank.

10. In a gear cutting machine of the character described, the combination of: means for rotatably supporting a face-type tool having a plurality of cutting edges adapted to follow each other through a tooth space, said cutting edges being arranged in the form of a spiral with a blank space between the last and the first edge thereof; means for rotatably supporting a tapered gear blank in cutting relation with the tool; means for continuously rotating the tool and gear blank in timed relation; and means for moving the tool in a straight line at right angles to the axis of rotation thereof and generally longitudinally of the tooth space being formed, in one direction while said plurality of cutting edges is passing therethrough, and in the opposite direction while the blank space is abreast of the gear blank.

11. In a gear cutting machine of the character described, the combination of: a tool support, means for rotatably supporting said tool support; means for attaching to said tool support a face-type tool having a plurality of cutting edges adapted to follow each other through a tooth space, said cutting edges being arranged in the form of a spiral with a blank space or gap between the last and the first thereof; a work spindle adapted to support a tapered gear blank in cutting relation with said tool; means for rotatably supporting said work spindle; means for continuously rotating said tool support and said work spindle in timed relation to each other; and means for moving the tool support in a straight line at right angles to the axis of rotation thereof and generally longitudinally of the tooth space being formed, in one direction while said plurality of cutting edges is passing therethrough, and in the opposite direction while the blank space or gap is abreast of the gear blank.

12. In a gear cutting machine of the character described, the combination of: a normally stationary tool head; a spindle rotatably supported in said tool head; means for rotating said spindle; a member rotatably and slidably supported in said tool head for rotation about an axis parallel to the axis of rotation of said spindle and for linear movement at right angles to said axis of rotation; means for driving said member from said spindle; means for connecting a face-type tool having a plurality of cutting edges adapted to follow each other through an interdental space to said member, said cutting edges being arranged in the form of a spiral with a blank space between the last and the first edge thereof; means for rotatably supporting a tapered gear blank in cutting relation with the tool; means for continuously rotating the gear blank in timed relation to the rotation of the tool; and means comprising a cooperating cam and cam follower operatively connected to said tool head and to said member for reciprocating said member upon rotation thereof whereby the tool is moved in a straight line at right angles to the axis of rotation thereof and generally longitudinally of the tooth space being formed, in one direction while said plurality of cutting edges is passing therethrough, and in the opposite direction while the blank space is abreast of the gear blank.

WILLIAM H. CASSEL.